United States Patent
Posselius et al.

(10) Patent No.: US 10,952,374 B2
(45) Date of Patent: Mar. 23, 2021

(54) SYSTEM AND METHOD FOR MONITORING RESIDUE OUTPUT FROM A HARVESTER

(71) Applicants: CNH Industrial America LLC, New Holland, PA (US); Autonomous Solutions, Inc., Mendon, UT (US)

(72) Inventors: John Henry Posselius, Ephrata, PA (US); Luca Ferrari, Formigine (IT); Taylor Chad Bybee, Logan, UT (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 334 days.

(21) Appl. No.: 15/583,707

(22) Filed: May 1, 2017

(65) Prior Publication Data
US 2018/0310474 A1 Nov. 1, 2018

(51) Int. Cl.
*A01D 41/127* (2006.01)
*A01D 41/12* (2006.01)
(Continued)

(52) U.S. Cl.
CPC ....... *A01D 41/127* (2013.01); *A01D 41/1243* (2013.01); *A01B 79/005* (2013.01);
(Continued)

(58) Field of Classification Search
CPC ....... A01B 17/002; A01B 33/08; A01B 33/16; A01B 35/32; A01B 41/06; A01B 63/002;
(Continued)

(56) References Cited

U.S. PATENT DOCUMENTS

| 5,569,081 A | 10/1996 | Baumgarten et al. |
| 5,685,245 A * | 11/1997 | Bassett ............... A01B 79/005 |
| | | 111/62 |

(Continued)

FOREIGN PATENT DOCUMENTS

| DE | 102012223434 A1 | 6/2014 |
| WO | 2015177190 | 11/2015 |

OTHER PUBLICATIONS

PCT Application No. PCT/US2018/030522 International Search Report and Written Opinion dated Jul. 11, 2018, 14 pgs.
(Continued)

*Primary Examiner* — Peter D Nolan
*Assistant Examiner* — Ce Li Li
(74) *Attorney, Agent, or Firm* — Rebecca L. Henkel; Rickard K. DeMille

(57) ABSTRACT

One or more tangible, non-transitory, machine-readable media including instructions that cause a processor to receive a signal indicative of a residue coverage on a surface of an agricultural field from a sensor, and the sensor is positioned behind a harvester system relative to a direction of travel. The instructions also cause the processor to determine the residue coverage on the surface of the agricultural field based on the signal, and the residue coverage includes a percentage of the agricultural field that is covered by residue. Further, the instructions cause the processor to control a residue control system based on the residue coverage.

20 Claims, 4 Drawing Sheets

(51) Int. Cl.

| | |
|---|---|
| G06T 7/00 | (2017.01) |
| H04N 5/225 | (2006.01) |
| A01B 79/00 | (2006.01) |

(52) U.S. Cl.
CPC .. *G06T 7/0004* (2013.01); *G06T 2207/30188* (2013.01); *H04N 5/2256* (2013.01)

(58) Field of Classification Search
CPC ....... A01B 63/28; A01B 79/00; A01B 79/005; A01C 21/002; A01C 23/007; A01C 23/023; A01C 23/025; A01C 5/064; A01C 5/068; A01C 7/006; A01C 7/06; A01C 7/102; A01C 7/20; A01C 7/203; A01C 7/205; A01D 37/00; A01D 41/127; A01D 75/187; A01D 91/04; G05B 15/02; G06T 2207/10024; G06T 2207/10048; G06T 2210/61; G06T 7/13; G06T 7/174; G06T 7/90; H04N 5/33; H04N 7/181
See application file for complete search history.

(56) References Cited

U.S. PATENT DOCUMENTS

| | | | |
|---|---|---|---|
| 5,809,440 | A | 9/1998 | Beck et al. |
| 6,866,580 | B2 | 3/2005 | Weichholdt et al. |
| 7,001,269 | B2 | 2/2006 | Weichholdt |
| 7,044,853 | B2 | 5/2006 | Weichholdt |
| 7,063,613 | B2 | 6/2006 | Weichholdt |
| 7,066,810 | B2 | 6/2006 | Farley et al. |
| 7,306,174 | B2 | 12/2007 | Pearson et al. |
| 7,485,035 | B1 | 2/2009 | Yde |
| 7,487,024 | B2 | 2/2009 | Farley et al. |
| 7,877,970 | B1* | 2/2011 | Crosby .................. A01D 37/00 56/10.2 R |
| 8,010,262 | B2 | 8/2011 | Schroeder et al. |
| 8,177,610 | B2 | 5/2012 | Birrell et al. |
| 8,393,137 | B1 | 3/2013 | Crosby |
| 8,463,510 | B2 | 6/2013 | Knapp |
| 8,924,030 | B2 | 12/2014 | Wendte et al. |
| 8,961,284 | B2 | 2/2015 | Wagner et al. |
| 9,220,195 | B2 | 12/2015 | Eggenhaus et al. |
| 9,282,688 | B2 | 3/2016 | Casper et al. |
| 9,563,848 | B1* | 2/2017 | Hunt ...................... G06Q 10/06 |
| 9,974,232 | B2* | 5/2018 | Shane ................ A01D 41/1243 |
| 10,143,131 | B2* | 12/2018 | Isaac .................. A01D 41/1243 |
| 2005/0059445 | A1* | 3/2005 | Niermann .......... A01D 41/1243 460/112 |
| 2005/0194473 | A1* | 9/2005 | Pearson .................. A01F 12/40 239/682 |
| 2006/0183519 | A1* | 8/2006 | Benes ................ A01D 41/1243 460/111 |
| 2006/0191251 | A1* | 8/2006 | Pirro ..................... A01D 43/085 56/60 |
| 2007/0026915 | A1* | 2/2007 | Anderson ............... A01F 12/40 460/112 |
| 2008/0268927 | A1* | 10/2008 | Farley .................. A01D 41/127 460/111 |
| 2009/0099737 | A1 | 4/2009 | Wendt et al. |
| 2009/0111548 | A1* | 4/2009 | Landuyt ............ A01D 41/1243 460/112 |
| 2010/0291982 | A1* | 11/2010 | Isaac ..................... A01F 12/40 460/112 |
| 2010/0291985 | A1* | 11/2010 | Pohimann .......... A01D 41/1243 460/112 |
| 2011/0130181 | A1* | 6/2011 | Roberge ............. A01D 41/1243 460/111 |
| 2012/0048159 | A1* | 3/2012 | Adams ................... A01C 7/203 111/163 |
| 2012/0048160 | A1* | 3/2012 | Adams ................... A01C 5/066 111/163 |
| 2012/0123650 | A1* | 5/2012 | Diekhans ............. A01D 43/085 701/50 |
| 2012/0245802 | A1* | 9/2012 | Schlesser ........... A01D 41/1243 701/50 |
| 2013/0324199 | A1* | 12/2013 | Roberge ............. A01D 41/1243 460/111 |
| 2014/0066148 | A1* | 3/2014 | Dilts ...................... A01F 12/40 460/111 |
| 2014/0302897 | A1* | 10/2014 | Isaac .................... A01D 41/127 460/111 |
| 2014/0325953 | A1* | 11/2014 | Patterson ................ A01F 12/58 56/500 |
| 2015/0066932 | A1* | 3/2015 | Stuber .................... G06Q 50/02 707/737 |
| 2015/0264864 | A1 | 9/2015 | Branch et al. |
| 2015/0305224 | A1* | 10/2015 | Casper .................... A01B 79/00 701/50 |
| 2015/0351321 | A1* | 12/2015 | Shane ................ A01D 41/1243 460/1 |
| 2016/0106022 | A1* | 4/2016 | Adams ................... A01C 7/205 172/4 |
| 2016/0106038 | A1 | 4/2016 | Boyd et al. |
| 2016/0134844 | A1* | 5/2016 | Casper .................... A01B 33/16 348/135 |
| 2016/0245703 | A1* | 8/2016 | Takase .................. G01N 33/20 |
| 2017/0086373 | A1* | 3/2017 | Mahieu ................ A01D 41/127 |
| 2017/0112043 | A1* | 4/2017 | Nair ...................... A01B 17/002 |
| 2017/0112055 | A1 | 4/2017 | Depreitere et al. |
| 2017/0212059 | A1* | 7/2017 | Charvat ................. G01S 13/887 |
| 2018/0084718 | A1* | 3/2018 | Baumgarten ...... A01D 41/1243 |
| 2018/0125000 | A1* | 5/2018 | Levy ....................... A01C 7/06 |

OTHER PUBLICATIONS

Bauer, Th, and P. Strauss; "A rule-based image analysis approach for calculating residues and vegetation cover under field conditions." Elsevier; Catena 113 (2014) 363-369.

Riegler-Nurscher, Peter, Johann Prankl, Thomas Bauer, Peter Strauss, and Heinrich Prankl; "An Integrated Image Analysis System for the Estimation of Soil Cover." CIGR-AgEng conference; Jun. 26-29, 2016, Aarhus, Denmark.

\* cited by examiner

SYSTEM AND METHOD FOR MONITORING RESIDUE OUTPUT FROM A HARVESTER

BACKGROUND

The present disclosure relates generally to a system and method for monitoring residue output from a harvester.

Generally, a harvester system processes agricultural crops, collects agricultural products from the crops, and deposits residue from the crops on an agricultural field as the harvester system passes through the agricultural field. Harvester systems typically include a chopper to break the residue down into smaller pieces before depositing the residue onto the field. The crop residue may decay in the agricultural field, thereby returning nutrients to the agricultural field. The properties of the crop residue in the agricultural field (e.g., size of the pieces of residue, percentage of the agricultural field that is covered by the residue, thickness of the residue coverage, and an evenness of the spread of the crop residue, etc.) may affect the amount of nutrients returned to the agricultural field. However, if the properties are not good and/or the properties are not known, the crop yield for a subsequent harvest may be reduced.

BRIEF DESCRIPTION

In one embodiment, one or more tangible, non-transitory, machine-readable media including instructions that cause a processor to receive a signal indicative of a residue coverage on a surface of an agricultural field from a sensor, and the sensor is positioned behind a harvester system relative to a direction of travel. The instructions also cause the processor to determine the residue coverage on the surface of the agricultural field based on the signal, and the residue coverage includes a percentage of the agricultural field that is covered by residue. Further, the instructions cause the processor to control a residue control system based on the residue coverage.

In another embodiment, a system for monitoring residue coverage on a surface of an agricultural field includes a controller that receives a signal indicative of a residue coverage on a surface of an agricultural field from a sensor, and the sensor is positioned behind a harvester system relative to a direction of travel. The controller also determines the residue coverage on the surface of the agricultural field based on the signal, and the residue coverage includes a percentage of the agricultural field that is covered by residue. Further, the controller output a control signal indicative of a set of settings to a residue control system based on the residue coverage.

In a further embodiment, a method for monitoring residue coverage on a surface of an agricultural field includes receiving a signal, via a controller, indicative of the residue coverage on the surface of the agricultural field from a sensor, and the sensor is positioned behind a harvester system relative to a direction of travel. The method also includes determining, via the controller, the residue coverage on the surface of the agricultural field based on the signal, and the residue coverage includes a percentage of the agricultural field that is covered by residue and an evenness value of the residue coverage. Further, the method includes generating, via the controller, a map of the residue coverage on the surface of the agricultural field. Moreover, the method includes storing, via a storage device, the map of the residue coverage.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
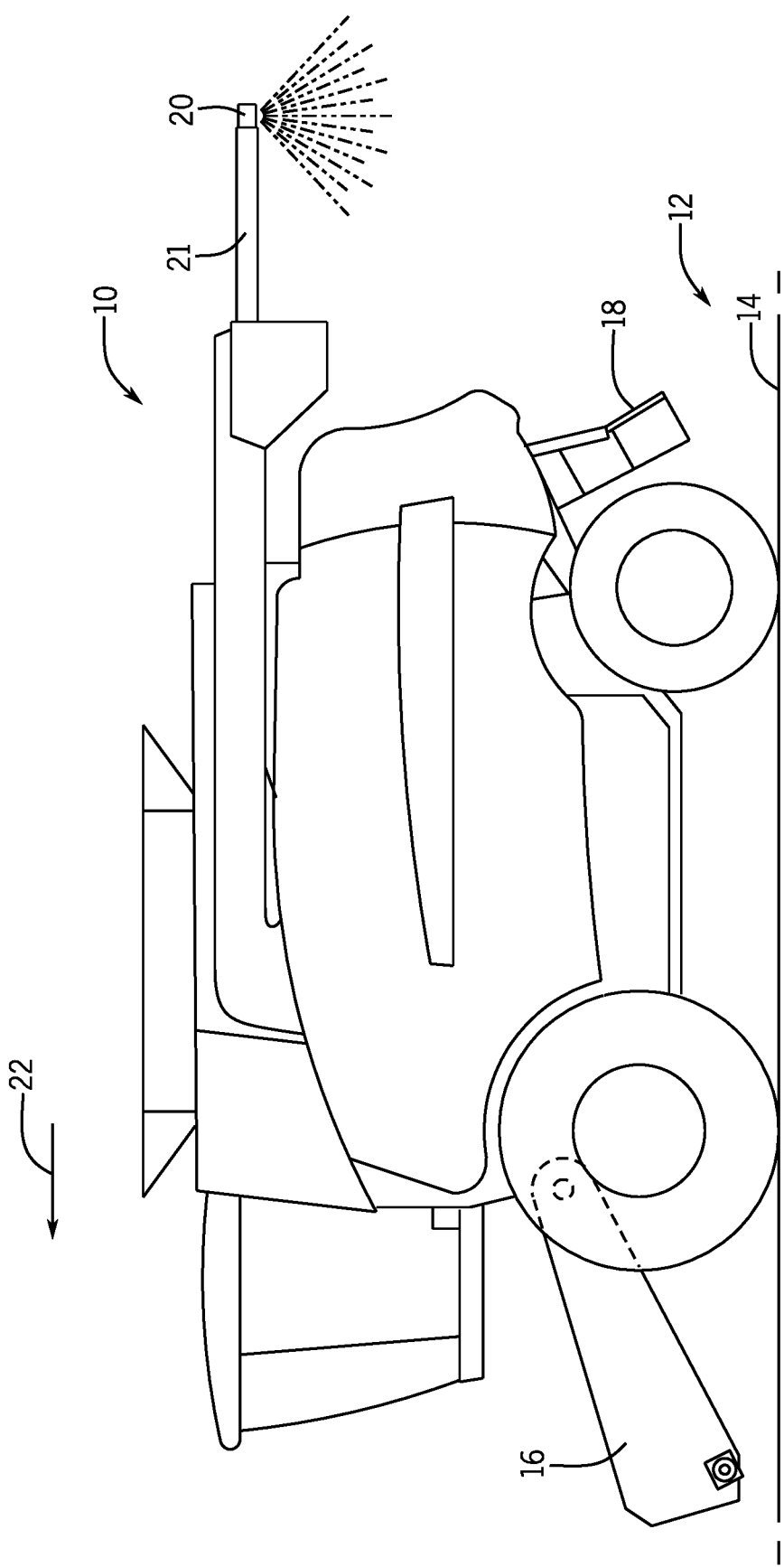
FIG. 1 is a side view of an embodiment of a harvester system travelling in an agricultural field.

Turning now to the drawings, FIG. 1 is a side view of an embodiment of a harvester system 10 travelling in an agricultural field 12. The harvester system 10 is configured to travel along a surface 14 of the agricultural field 12 in a direction of travel 22. As the harvester system 10 travels through the agricultural field 12, a header 16 disposed at the front of the harvester system 10 collects agricultural crops. The harvester system 10 processes the agricultural crops to separate a portion that is collected (e.g., agricultural product) from a portion that is returned to the field (e.g., residue). The portion that is returned to the field (e.g., residue) is discharged by the harvester system 10 at a residue spreader 18. Further, the crop residue that is returned to the field covers the field and may be used to return nutrients to the agricultural field 12.

After the crop residue has been discharged back onto the surface 14, a sensor assembly 20 monitors the residue. The sensor assembly 20 is disposed behind the harvester system 10 relative to the direction of travel 22, which enables the sensor assembly 20 to monitor the surface 14 behind the harvester system 10. While the sensor assembly 20 is coupled to a bar 21 that extends from the top of the harvester system 10 in the present embodiment, it should be appreciated that, in alternative embodiments, the sensor assembly may be coupled to the harvester system in another suitable way that enables the sensor assembly to monitor the surface behind the harvester system.

In certain embodiments, the harvester system 10 includes a chopper that receives the crop residue (e.g., from a crop processing system within the harvester system) and breaks down the crop residue into smaller pieces. The chopper may include a rotating shaft with flailing knives that breaks down the crop residue as the shaft rotates. The speed and/or position of the chopper may be adjusted to alter the size and/or rate of the breakdown of the crop residue. For example, the chopper may be moved up, down, left, or right, and/or the rate of rotation of the chopper may be increased or decreased.

In certain embodiments, the residue spreader 18 may also be controlled to adjust the spread of the residue along the surface 14. For example, the residue spreader 18 may be controlled to spread the residue substantially evenly across the surface 14. The residue spreader 18 may be controlled to move up, down, left, or right, such that the residue is deposited in a target location. The residue spreader 18 may be further controlled to increase or decrease the width of the residue spread. For example, an exit conduit of the residue spreader 18 may expand or contract to provide a target dispersion of the crop residue. The combination of controlling the aim and discharge width of the residue spreader 18 may adjust the spread of the residue, thereby making the residue coverage substantially even behind the harvester system 10.

Figure 2:
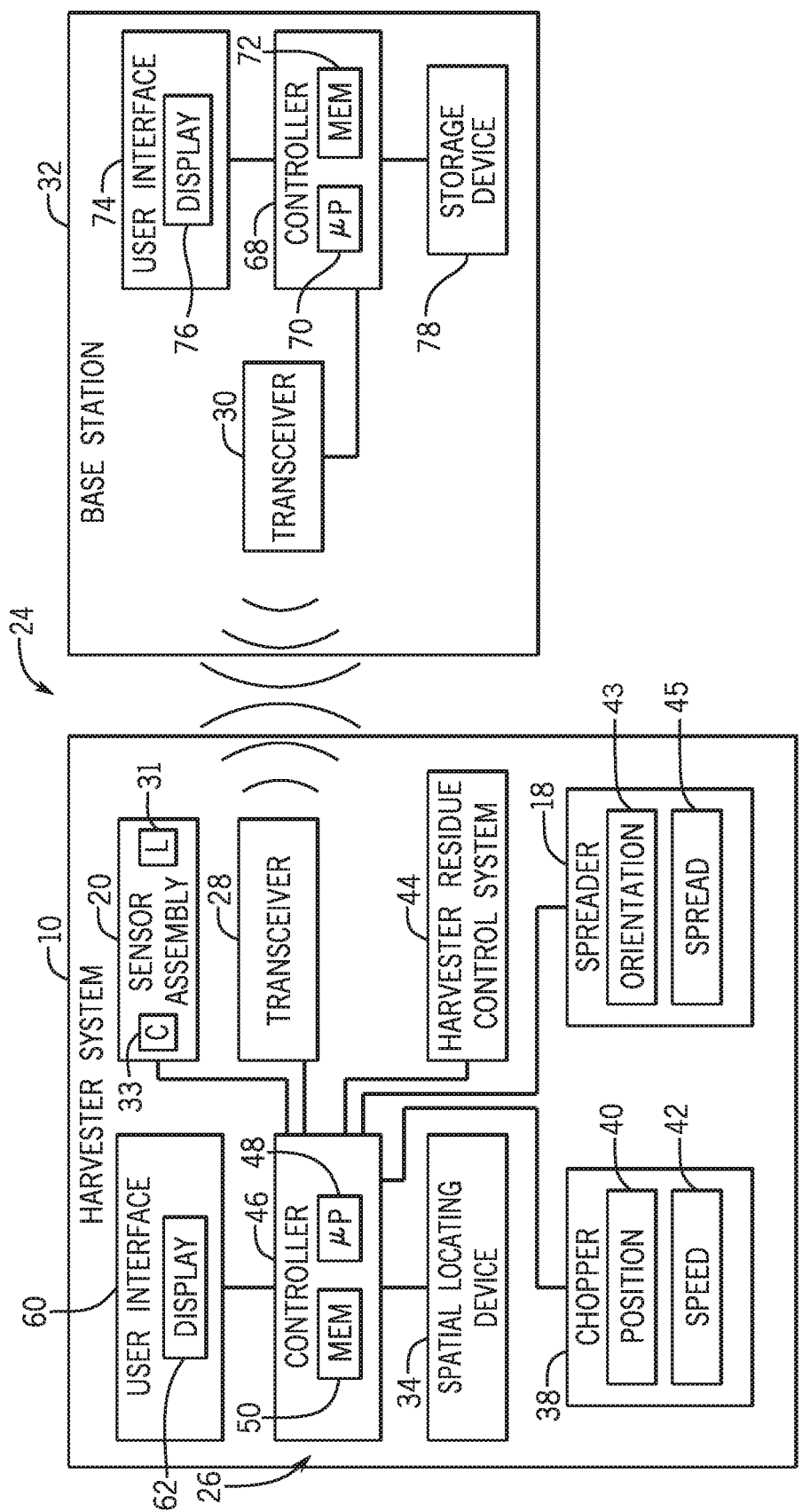
FIG. 2 is a schematic diagram of an embodiment of a residue coverage control system that may be utilized within the harvester system of FIG. 1.

FIG. 2 is a schematic diagram of an embodiment of a residue coverage control system 24 that may be utilized within the harvester system 10 of FIG. 1. In the illustrated embodiment, the residue coverage control system 24 includes a control system 26 (e.g., mounted on the harvester system 10), and the control system 26 includes a first transceiver 28 configured to establish a wireless communication link with a second transceiver 30 of a base station 32. As will be appreciated, the first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol.

In the illustrated embodiment, the control system 26 includes a spatial locating device 34, which is mounted to the harvester system 10 and configured to determine a position of the harvester system 10. The spatial locating device may include any suitable system configured to determine the position of the harvester system, such as a global positioning system (GPS), for example. In certain embodiments, the spatial locating device 34 may be configured to determine the position of the harvester system 10 relative to a fixed point within the field (e.g., via a fixed radio transceiver). Accordingly, the spatial locating device 34 may be configured to determine the position of the harvester system 10 relative to a fixed global coordinate system (e.g., via the GPS) or a fixed local coordinate system. In certain embodiments, the first transceiver 28 is configured to broadcast a signal indicative of the position of the harvester system 10 to the transceiver 30 of the base station 32.

In addition, the harvester system 10 includes the sensor assembly 20. The sensor assembly 20 is configured to facilitate determination of the residue coverage on the surface of the agricultural field. In certain embodiments, the sensor assembly may include one or more sensors (e.g., image sensor(s) (e.g., camera(s)), radar sensor(s), terahertz sensor(s), infrared sensor(s), ultrasonic sensor(s), capacitance sensor(s), light detection and ranging (LiDAR) sensor(s), etc.), each configured to monitor the residue coverage on the surface behind the harvester system relative to the direction of travel. In addition, the sensor assembly may include a lighting assembly (e.g., an LED light, a halogen light, etc.) that provides light for the images captured by the image sensor(s). The lighting assembly may reduce shadows cast by an element of the harvester system structure, the sensor assembly, clouds in the sky, etc. Utilizing the lighting assembly may provide more consistent lighting for the image sensor(s), which may increase the accuracy of the data produced by the sensor assembly 20. In certain embodiments, the sensor assembly could include a combination of different sensors, and the lighting assembly may be configured to provide light in different spectrums of the electromagnetic spectrum. For example, the lighting assembly could provide lighting in the infrared spectrum for an infrared sensor. Further, the sensor assembly 20 may include one or more sensors (e.g., a wind vane, an anemometer, or both) that are configured to monitor a wind speed and direction. As discussed in detail below, the residue coverage may include the percentage of the surface covered by residue, the spread of the residue, the evenness of the residue, the thickness of the residue, or any combination thereof.

In certain embodiments, a controller 46 is an electronic controller having electrical circuitry configured to process data from the transceiver 28, the spatial locating device 34, the sensor assembly 20, or a combination thereof, among other components of the harvester system 10. In the illustrated embodiment, the controller 46 includes a processor, such as the illustrated microprocessor 48, and a memory device 50. The controller 46 may also include one or more storage devices and/or other suitable components. The processor 48 may be used to execute software, such as software for controlling the harvester system 10, and so forth. Moreover, the processor 48 may include multiple microprocessors, one or more "general-purpose" microprocessors, one or more special-purpose microprocessors, and/or one or more application specific integrated circuits (ASICS), or some combination thereof. For example, the processor 48 may include one or more reduced instruction set (RISC) processors.

The memory device 50 may include a volatile memory, such as random access memory (RAM), and/or a nonvolatile memory, such as ROM. The memory device 50 may store a variety of information and may be used for various purposes. For example, the memory device 50 may store processor-executable instructions (e.g., firmware or software) for the processor 48 to execute, such as instructions for controlling the harvester system 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., residue coverage maps, harvesting settings, etc.), instructions (e.g., software or firmware for controlling the harvester system, etc.), and any other suitable data.

The control system 26 includes a residue control system 44 configured to control various parameters of the harvester system 10. For example, in certain embodiments, the residue control system 44 may be configured to instruct the controller 46 (e.g., via a communication link, such as a CAN bus or ISOBUS) to adjust a chopper 38 or the spreader 18 of the harvester system 10. By way of example, the harvester control system 44 may instruct the controller 46 to change an position 40 of the chopper 38 (e.g., up, down, left, or right), a speed 42 of the chopper 38, an orientation 43 of the spreader 18 (e.g., up, down, left, or right), a spread 45 of the spreader 18 (e.g. expand or contract), or any combination thereof.

In the illustrated embodiment, the harvester system 10 includes a user interface 60 communicatively coupled to the controller 46. The user interface 60 is configured to present data from the harvester system to an operator (e.g., data associated with operation of the harvester system). The user interface 60 is also configured to enable an operator to control certain functions of the harvester system (e.g., starting and stopping the harvester system, etc.). In the illustrated embodiment, the user interface 60 includes a display 62 configured to present information to the operator, such as the position of the harvester system 10 within the field, the speed of the harvester system 10, the path of the harvester system 10, the residue coverage behind the harvester system 10, images or video from the sensor assembly 20, among other data.

As previously discussed, the control system 26 is configured to communicate with the base station 32 via the transceivers 28 and 30. In the illustrated embodiment, the base station includes a controller 68 communicatively coupled to the base station transceiver 30. The controller 68 may be configured to output commands and/or data to the harvester system 10. For example, as discussed in detail below, the controller 68 may be configured to perform at least some of the same operations as the controller 46.

In certain embodiments, the controller 68 is an electronic controller having electrical circuitry configured to process data from certain components of the base station 32 (e.g., the transceiver 30). In the illustrated embodiment, the controller 68 includes a processor, such as the illustrated microprocessor 70, and a memory device 72. The processor 68 may be used to execute software, such as software for providing commands and/or data to the harvester system controller 46, and so forth. Moreover, the processor 48 may include multiple microprocessors, one or more "general-purpose" microprocessors, one or more special-purpose microprocessors, and/or one or more application specific integrated circuits (ASICS), or some combination thereof. For example, the processor 70 may include one or more reduced instruction set (RISC) processors. The memory device 72 may include a volatile memory, such as random access memory (RAM), and/or a nonvolatile memory, such as ROM. The memory device 72 may store a variety of information and may be used for various purposes. For example, the memory device 72 may store processor-executable instructions (e.g., firmware or software) for the processor 70 to execute, such as instructions for providing commands and/or data to the harvester system controller 46.

In the illustrated embodiment, the base station 32 includes a user interface 74 communicatively coupled to the controller 68. The user interface 74 is configured to present data from the harvester system to an operator (e.g., data associated with operation of the harvester system). The user interface 74 is also configured to enable an operator to control certain functions of the harvester system (e.g., starting and stopping the harvester system, etc.). In the illustrated embodiment, the user interface includes a display 76 configured to present information to the operator, such as the position of the harvester system 10 within the field, the speed of the harvester system, the path of the harvester system, the residue coverage behind the harvester system, images or video from the sensor assembly 20 among other data.

In the illustrated embodiment, the base station 32 includes a storage device 78 communicatively coupled to the controller 68. The storage device 78 (e.g., nonvolatile storage) may include read-only memory (ROM), flash memory, a hard drive, or any other suitable optical, magnetic, or solid-state storage medium, or a combination thereof. The storage device(s) may store data (e.g., residue coverage maps, etc.), instructions (e.g., software or firmware for controlling the harvester system, etc.), and any other suitable data. For example, the controller 46 or the controller 68 may receive data from the sensor assembly 20 and the spatial locating device 34. From this data, the controller 46 or the controller 68 may create a map of the residue coverage in the agricultural field. The map may include data relating to the location and distribution of the residue coverage in the agricultural field.

While the control system 26 of the residue coverage control system 24 includes the controller 46 in the illustrated embodiment, it should be appreciated that in alternative embodiments, the control system 26 may include the controller 68. For example, in certain embodiments, certain functions of the control system 26 may be distributed between the controller 46 and the controller 68. In further embodiments, the controller 68 may perform a substantial portion of the functions of the control system 26. For example, in certain embodiments, the transceiver 28 may output signals indicative of the residue coverage to the transceiver 30. In such embodiments, the transceiver 30 may output corresponding signals to the controller 68, and the controller 68 may build a residue coverage map and determine a control action based on the residue coverage and output a signal indicative of the control action. For example, the controller 68 may output instructions to the controller 46 (e.g., via the transceivers 28 and 30), instructing the residue control system 44 to change an position 40 of the chopper 38 (e.g., up, down, left, or right), a speed 42 of the chopper 38, an orientation 43 of the spreader 18 (e.g., up, down, left, or right), a spread 45 of the spreader 18 (e.g. expand or contract), or any combination thereof.

Figure 3:
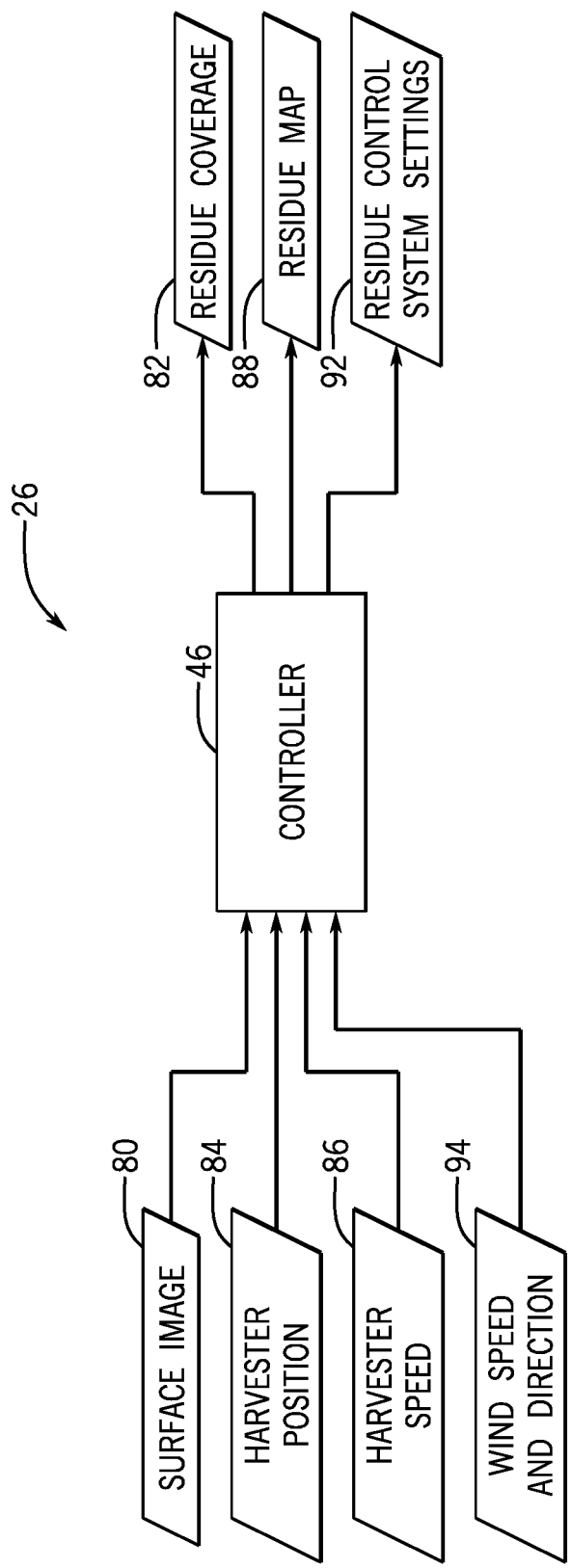
FIG. 3 is a block diagram of an embodiment of a control system that may be employed within the residue coverage control system of FIG. 2.

FIG. 3 is a block diagram of an embodiment of the control system 26 that may be employed within the residue coverage control system of FIG. 2. In the illustrated embodiment, the control system 26 includes the controller 46. However, as previously discussed, the control system may include the base station controller (e.g., alone or in combination with the controller 46). As illustrated, the controller 46 receives a signal 80 indicative of an image of the surface of the agricultural field. The signal 80 is received from the sensor assembly, which is configured to monitor the surface by collecting images. In certain embodiments, the sensor assembly may include sensors, whose output data is in formats other than images, or may be converted to images. The controller 46 determines an output signal 82 indicative of the residue coverage of the surface based on the signal 80. The controller may determine the residue coverage 82 by comparing differences in color. For example, the residue may be a different color from the underlying soil of the agricultural field or the residue may be a lighter color than the soil. The controller 46 may detect these differences and determine which portions of the surface image include residue and which portions of the surface image include soil. From this determination, the controller 46 may determine various properties of the residue, including what percentage of the surface is covered by residue, the average size of the residue, or the evenness of the spread of the residue (i.e., how uniform the residue is distributed in the image).

In the illustrated embodiment, the controller 46 also receives a signal 84 indicative of the harvester position. Further, in the illustrated embodiment, the controller 46 receives a signal 86 indicative of the harvester speed. In certain embodiments, the signal 84 and the signal 86 are received from the spatial locating device, which is configured to determine the location and rate of change of the location (i.e., speed and acceleration) of the harvester system. The controller 46 is configured to utilize the surface image signal 80, the harvester position signal 84, and the harvester speed signal 86 to create an output signal 88 indicative of a residue coverage map of the agricultural field. The output signal 88 may be displayed in real-time to an operator (e.g., via the user interface of the harvester system or base station). In addition, the output signal 88 may also be stored in the storage device. Further, the residue coverage map may be utilized to control subsequent tillage and/or seeding/planting operations. For example, the residue coverage map may be utilized during seeding/planting operations to control application rate and/or seed spacing, and/or the residue coverage map may be utilized during tillage operations to control the penetration depth of tilling tools. In addition, the residue coverage map may be utilized to determine a target degree of tilling for each section of the agricultural field. Further, the residue coverage map may be utilized to determine distribution of fertilizer for each section of the agricultural field.

In the illustrated embodiment, the controller 46 receives a signal 94 indicative of the wind speed and the wind direction. As discussed above, the wind speed and wind direction may be monitored and a signal may be output by the sensor assembly to the controller 46. As discussed above, the residue coverage output signal 82 and the residue map output signal 88 may be displayed to an operator (e.g., on the display of the harvester user interface or the display of the base station user interface). In turn, the operator may manually adjust the residue control system settings to control output of the residue. In other embodiments, the controller may determine residue control system settings and output an output signal 92 indicative of the residue control system settings. For example, the residue control system settings may include a speed and position for the chopper, and an orientation and spread of the residue spreader. As discussed above, these settings may adjust the spread and coverage of the residue along the surface. In still other embodiments, the controller may determine the residue control system settings based on the wind speed and direction signal 94 and the residue coverage output signal 82 to create the residue control system settings output signal 92. The residue control system settings output signal 92 may be output substantially continuously (e.g., at a frequency of a second or less), the residue coverage output signal 92 may be output at time intervals, or the controller may output the residue control system settings output signal 92 after a threshold value has been reached. For example, a threshold value may be assigned for each of the residue coverage properties (e.g., what percentage of the surface is covered by residue, the average size of the pieces of residue, the evenness of the spread of the residue (i.e., how uniform the residue is distributed in the image), the thickness of the residue, the position of the residue relative to the harvester, the size of the pieces of residue). After the threshold value has been crossed for any combination of the residue coverage properties, the controller may output the residue control system settings output signal 92.

For example, if the residue coverage output signal 82 indicates that the residue is not evenly spread on the surface, the residue control system setting output signal 92 may adjust the position of the chopper or spreader so that the portion of the surface receiving fewer pieces of residue receives more pieces of residue. For example, if the left side of the surface is receiving fewer pieces of reside, the position of the chopper and/or spreader may be adjusted to the left to provide more pieces of residue to the left. Alternatively, if the pieces of residue are determined to be too large, the speed of the chopper may increase so that the size of the pieces of residue are reduced. Alternatively, if the residue spread is too narrow, the opening of the spreader can be expanded to allow for a wider spread of residue. Alternatively, if the residue is deposited to close to the harvester, the orientation of the spreader may be adjusted upwards. Alternatively, if the thickness of the residue is too high, the quantity of residue deposited may increase.

Figure 4:
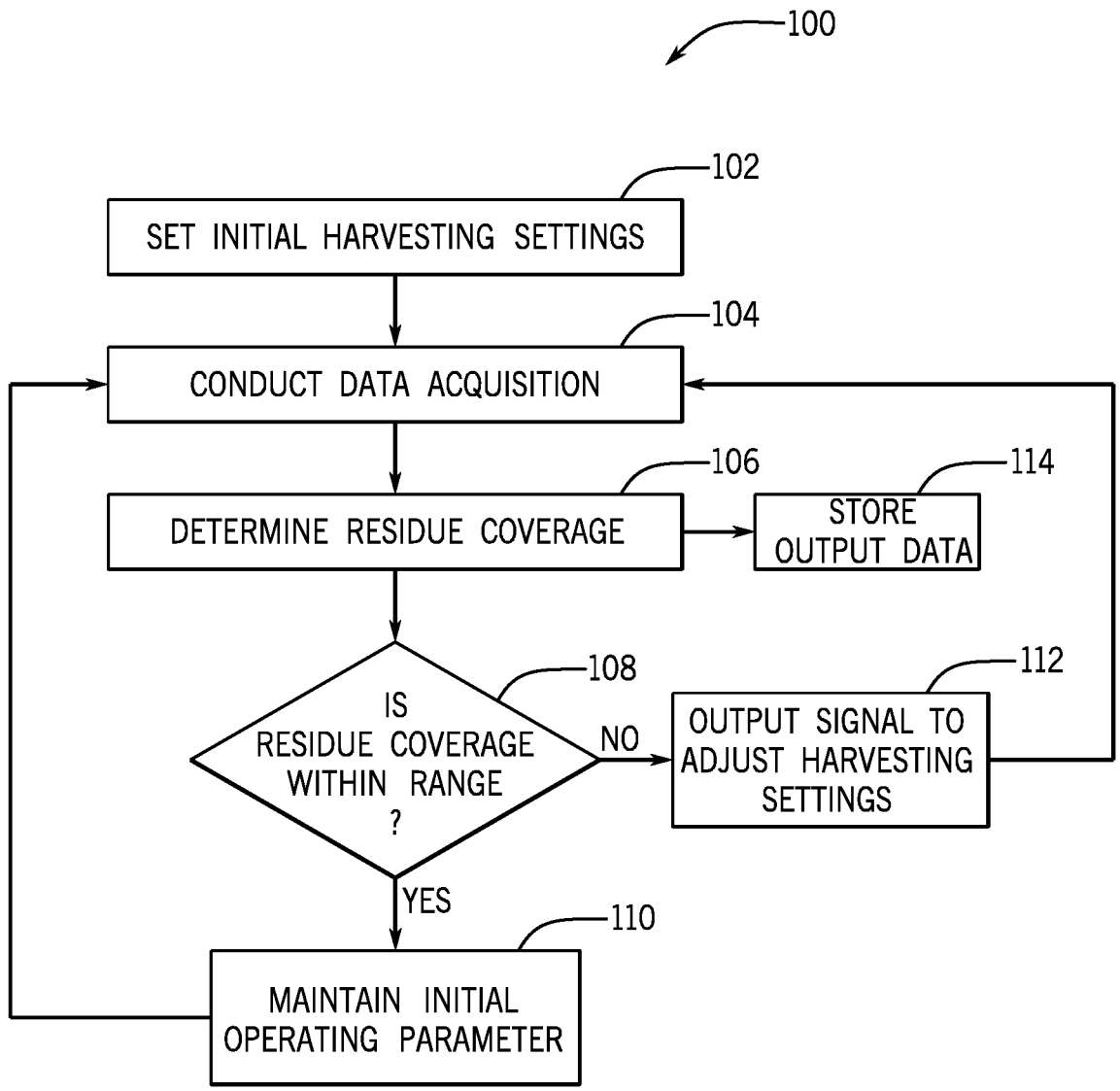
FIG. 4 is a flowchart of an embodiment of a process for controlling harvesting settings of the harvester system of FIG. 1.

FIG. 4 is a flowchart of an embodiment of a process 100 for controlling residue control system settings of the harvester system 10. The process 100 enhances the uniformity of the residue coverage across the surface of the agricultural field. Although the following process 100 includes a number of operations that may be performed, it should be noted that the process 100 may be performed in a variety of suitable orders. All of the operations of the process 100 may not be performed. Further, all of the operations of the process 100 may be performed by the harvester controller 46, the base station controller 68, or a combination thereof. It should be appreciated that the harvester controller 46 may perform all of the functions of the base station controller 68, and the base station controller 68 may perform all of the functions of the harvester controller 46.

Initial residue control system settings of the residue control system may be set (block 102). For example the operator may set an initial position and/or speed of the chopper, an initial orientation and/or width of the spreader, or a combination thereof. In certain embodiments, the initial operating parameters are based on prior agricultural operations from a previous season or from saved initial settings.

Then, data acquisition may be conducted (block 104). For example, the sensor assembly may include one or more sensors (e.g., image sensor(s) (e.g., camera(s)), radar sensor(s), terahertz sensor(s), infrared sensor(s), ultrasonic sensor(s), capacitance sensor(s), LiDAR sensor(s), etc.), each configured to monitor the residue coverage on the surface behind the harvester system relative to the direction of travel. In addition, the sensor assembly may include a lighting assembly (e.g., an LED light, a halogen light, etc.) that provides light for the images captured by the image sensor(s). The lighting assembly may reduce shadows cast by an element of the harvester system structure, the sensor assembly, clouds in the sky, etc. Utilizing the lighting assembly may provide more consistent lighting for the image sensor(s), which may increase the accuracy of the data produced by the sensor assembly 20.

Next, the residue coverage and/or the residue coverage map is determined (block 106). After conducting the data acquisition, the controller may analyze the data to determine the residue coverage on the surface of the agricultural field. As discussed above, the residue coverage may include properties relating to percentage of the surface is covered by residue, the average size of the pieces of residue, the evenness of the spread of the residue (i.e., how uniform the residue is distributed in the image), the thickness of the residue (i.e., the quantity of residue deposited on the surface), the position of the residue relative to the harvester, or a combination thereof, among other residue properties. Further, from the data, the controller may create a map of the residue coverage in the agricultural field. The map may include data relating to the location and distribution of the residue coverage in the agricultural field.

The residue coverage is then evaluated (block 108). For example, the controller may evaluate whether one or more of the residue coverage properties are within a specified range. In certain embodiments, the range may include a threshold minimum value, a threshold maximum value, or a combination thereof. For example, the range may include a threshold minimum value corresponding to the percentage of the surface is covered by residue (i.e., 5%, 10%, 20%, 30%, 40%, 50%), the average size of the pieces of residue (i.e., 1 centimeter ("cm"), 2 cm, 3 cm, 4 cm, 5 cm), the evenness of the spread of the residue, the thickness of the residue, or the position of the residue relative to the harvester. Further, the range may include a threshold maximum value corresponding to the percentage of the surface is covered by residue (i.e., 40%, 50%, 60%, 70%, 80%, 90%), the average size of the pieces of residue (i.e., 3 cm, 5 cm, 7 cm, 10 cm, 15 cm), the evenness of the spread of the residue, the thickness of the residue, or the position of the residue relative to the harvester.

If the residue coverage is within the specified range, the controller may output a signal to the residue coverage system indicative of instructions to maintain (block 110) the initial operating parameter. Thereafter, the sensor assembly may continue to conduct (block 104) data acquisition as the harvester system moves through the agricultural field.

However, if the residue coverage is outside of the specified range, the controller may output (block 112) a signal to the residue control system indicative of instructions to adjust the operating parameter from the initial operating parameter to an adjusted operating parameter. The adjusted operating parameter may be determined by referencing a data table that includes changes to operating parameter values correlated to desired changes in residue coverage properties. For example, if an increase of 10% in percentage of the surface covered by residue is desired, the data table may include changes in operating parameter values corresponding to a 10% increase in percentage of the surface covered by residue. Thereafter, the sensor assembly may conduct (block 104) additional data acquisition. Accordingly, the residue coverage may be monitored and adjusted during harvesting.

Further, the data that acquired at block 104 may also be stored (block 114) in the storage device. This data may be stored such that a map of the residue coverage within the agricultural field is created. The residue coverage map may be utilized to control subsequent tillage and/or seeding/planting operations. For example, the residue coverage map may be utilized during seeding/planting operations to control application rate and/or seed spacing, and/or the residue coverage map may be utilized during tillage operations to control the penetration depth of tilling tools. In addition, the residue coverage map may be utilized to determine a target degree of tilling for each section of the agricultural field. Further, the residue coverage map may be utilized to determine distribution of fertilizer for each section of the agricultural field.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. One or more tangible, non-transitory, machine-readable media comprising instructions configured to cause a processor to:
   receive a signal indicative of one or more properties of a residue coverage on a surface of an agricultural field from a sensor, wherein the sensor is positioned behind a harvester system relative to a direction of travel;
   determine the one or more properties of the residue coverage on the surface of the agricultural field based on the signal; and
   control a left/right position of a chopper of the harvester system based on the one or more properties of the residue coverage, wherein the chopper is configured to receive residue from a crop processing system within the harvester system and to break down the residue into smaller pieces, and to deliver the residue to a spreader that is configured to discharge the residue to the surface of the agricultural field.

2. The one or more tangible, non-transitory, machine-readable media comprising instructions of claim 1, wherein the sensor comprises a camera with a lighting assembly, wherein the lighting assembly is configured to illuminate the surface of the agricultural field.

3. The one or more tangible, non-transitory, machine-readable media comprising instructions of claim 1, wherein the sensor comprises a terahertz sensor.

4. The one or more tangible, non-transitory, machine-readable media comprising instructions of claim 1, wherein the one or more properties of the residue coverage comprise an evenness value of the residue coverage, a percentage of the agricultural field that is covered by the residue, an average size of the residue in the residue coverage, or a combination thereof.

5. The one or more tangible, non-transitory, machine-readable media comprising instructions of claim 1, wherein the instructions are configured to cause the processor to receive a location signal indicative of the location of the residue coverage from a spatial locating device.

6. The one or more tangible, non-transitory, machine-readable media comprising instructions of claim 5, wherein the instructions are configured to cause the processor to generate a map of the residue coverage on the surface of the agricultural field.

7. The one or more tangible, non-transitory, machine-readable media comprising instructions of claim 6, wherein the instructions are configured to cause the processor to store the map of the residue coverage in a storage device.

8. The one or more tangible, non-transitory, machine-readable media comprising instructions of claim 1, wherein the instructions are configured to cause the processor to control a left/right orientation or a width of the spreader of the harvester system based on the one or more properties of the residue coverage.

9. The one or more tangible, non-transitory, machine-readable media comprising instructions of claim 1, wherein the instructions are configured to cause the processor to control a speed of the chopper of the harvester system based on the one or more properties of the residue coverage.

10. A system for monitoring a residue coverage on a surface of an agricultural field comprising:
    a controller configured to:
      receive a signal indicative of the residue coverage on the surface of the agricultural field from a sensor, wherein the sensor is positioned behind a harvester system relative to a direction of travel;

determine the residue coverage on the surface of the agricultural field based on the signal; and control a left/right position of a chopper of the harvester system based on the residue coverage, wherein the chopper is configured to receive residue from a crop processing system within the harvester system and to break down the residue into smaller pieces, and to deliver the residue to a spreader that is configured to discharge the residue to the surface of the agricultural field.

11. The system of claim 10, wherein the sensor comprises a camera with a lighting assembly, wherein the lighting assembly is configured to illuminate the surface of the agricultural field.

12. The system of claim 10, wherein the sensor comprises a terahertz sensor.

13. The system of claim 10, wherein the controller is configured to:

receive a location signal indicative of the location of the residue coverage from a spatial locating device;

generate a map of the residue coverage on the surface of the agricultural field; and store the map of the residue coverage in a storage device.

14. The system of claim 10, wherein the controller is configured to control a left/right orientation or a width of the spreader based on the residue coverage.

15. A method for monitoring a residue coverage on a surface of an agricultural field comprising:

receiving a signal, via a controller, indicative of the residue coverage on the surface of the agricultural field from a sensor, wherein the sensor is positioned behind a harvester system relative to a direction of travel;

determining, via the controller, the residue coverage on the surface of the agricultural field based on the signal;

generating, via the controller, a map of the residue coverage on the surface of the agricultural field;

storing, via a storage device, the map of the residue coverage; and controlling, via the controller, a left/right position of a chopper of the harvester system based on the residue coverage, wherein the chopper is configured to receive residue from a crop processing system within the harvester system and to break down the residue into smaller pieces, and to deliver the residue to a spreader that is configured to discharge the residue to the surface of the agricultural field.

16. The method of claim 15, comprising setting, via the controller, an initial plurality of harvesting settings, wherein the initial plurality of harvesting settings comprises the left/right position of the chopper.

17. The method of claim 16, comprising determining, via the controller, whether the residue coverage is within a predetermined range of values.

18. The method of claim 17, comprising maintaining, via the controller, the initial plurality of harvesting settings in response to a determination that the residue coverage is within the predetermined range of values.

19. The method of claim 17, wherein controlling the left/right position of the chopper comprises adjusting, via the controller, at least one of the initial plurality of harvesting settings in response to a determination that the residue coverage is not within the predetermined range of values.

20. The method of claim 15, comprising controlling, via the controller, the speed of the chopper of the harvester system based on the residue coverage.

* * * * *